United States Patent

Bell et al.

[15] 3,677,292
[45] July 18, 1972

[54] PIPELINE FLOW TEE

[72] Inventors: Howard F. Bell; John A. Scheineman, both of Houston, Tex.

[73] Assignee: Shell Oil Company, New York, N.Y.

[22] Filed: Feb. 11, 1970

[21] Appl. No.: 10,544

[52] U.S. Cl................................137/544, 302/23, 243/23, 285/156
[51] Int. Cl.................................................F16l 41/00
[58] Field of Search................285/156; 15/104.06; 137/268, 137/544; 243/23; 302/23

[56] References Cited

UNITED STATES PATENTS

| | | | |
|---|---|---|---|
| 2,845,631 | 8/1958 | Kozlowski et al. | 285/178 X |
| 2,846,013 | 8/1958 | Davis | 285/178 X |
| 3,091,483 | 5/1963 | Hruby | 285/156 X |
| 3,387,483 | 6/1968 | Van Arsdale | 15/104.06 X |
| 2,457,041 | 12/1948 | Harza | 285/156 X |
| 2,589,170 | 3/1952 | Ver Nooy | 15/104.06 |
| 3,166,094 | 1/1965 | Eagleton | 137/544 |
| 3,205,016 | 9/1965 | Panning | 302/23 |
| 3,246,355 | 4/1966 | Van Scoy | 15/104.06 |
| 3,511,272 | 5/1970 | Lathrop | 137/544 |

FOREIGN PATENTS OR APPLICATIONS 964,683  7/1964  Great Britain...................285/156

*Primary Examiner*—Henry T. Klinksiek
*Attorney*—Louis J. Bovasso and J. H. McCarthy

[57] ABSTRACT

A method and apparatus for passing a pipeline sphere through a flow tee disposed in a pipeline whereby fluid flowing through the pipeline may selectively be flowed through at least one of the outlets of the run of the flow tee or the branch outlet of the flow tee while preventing the sphere from entering the branch outlet. A gap is formed in the run of the flow tee at its junction with the branch outlet so that fluid may pass through either the run or the branch outlet when the run is occupied by a pipeline sphere. This gap is approximately equal to between 1½ and 2 times the diameter of the sphere.

2 Claims, 5 Drawing Figures

PIPELINE FLOW TEE

BACKGROUND OF THE INVENTION

1. Field of the Invention

The invention relates to pipeline flow tees; and, more particularly, to apparatus and method for passing a pipeline sphere through the flow tee of a pipeline whereby fluid flowing in the pipeline may be selectively flowed through at least one of the run or the branch outlet of the flow tee.

2. Description of the Prior Art

The accumulation of waxes, asphaltines, and scale in flow lines tends to restrict flow through such lines. Various chemical, mechanical and heating methods have been proposed for removing deposits from the internal surfaces of flow lines, tubing, pipes and the like. Such mechanical methods include the use of a pipeline cleaning plug or "pig" which is inserted into a pipeline and forced through the line by the pressure of the fluid flowing therethrough to thereby remove deposits from the wall of the pipeline and thus (1) clean the pipeline of the aforementioned restrictions, (2) separate fluids, (3) apply coatings, and (4) measure the rate of flow.

A pipeline flow tee is a tee which allows fluid flow to go from the run of the tee out through the branch outlet thereof while a pipeline pig, such as a sphere, plug, or scraper, passes on through the run of the tee. The prime considerations for an adequate flow tee are (1) scraper, plug, and/or sphere handling characteristics, and (2) pressure drops characteristics. In regard to sphere, play and/or scraper handling characteristics, the sphere, plug, or scraper should pass the flow tee, with the branch outlet thereof blocked, at all velocities which will be encountered, and should pass out the run of the tee and cause minimum surge and pressure drop with the down-stream run of the tee blocked and all flow going through the branch outlet. Errors or malfunctions in bypass valve sequencing should not cause damage to the pipeline, sphere, plug, or scraper. In regard to pressure drop characteristics, the flow tee should cause a minimum of permanent pressure drop as a pressure drop savings are directly related to power savings. Known prior art pipe tees have the inherent characteristics of either excess friction loss at high velocities or sphere-stalling at low velocities.

SUMMARY OF THE INVENTION

It is an object of this invention to provide an improved method and apparatus for fluid flow through a pipeline flow tee.

It is a further object of this invention to provide a method and apparatus for fluid flow through a pipe tee wherein, at all velocities encountered in the tee, a pipeline sphere will pass through the run of the tee with the branch outlet blocked.

These and other objects are preferably accomplished by providing a flow tee which may be disposed in a pipeline whereby fluid flowing through the pipeline may be selectively flowed through the run of the flow tee or the branch outlet of the flow tee while preventing the sphere from entering the branch outlet. Gap means is formed in the run of the flow tee at its junction with the branch outlet so that fluid may pass through either the run or out the branch when the run is occupied by the spheres. The gap provides adequate flow area with a sphere in the tee, and allows space for the sphere to decelerate with minimum pressure surge if the run outlet is blocked. The gap also releases the sphere, leaving it free to move with the flow. Preferably, an inclined ramp leads from the inlet of the run to the outlet thereof allowing a sphere to roll down the ramp and out of the flow tee at minimum flow rates.

DESCRIPTION OF THE PREFERRED EMBODIMENT

Figure 1:
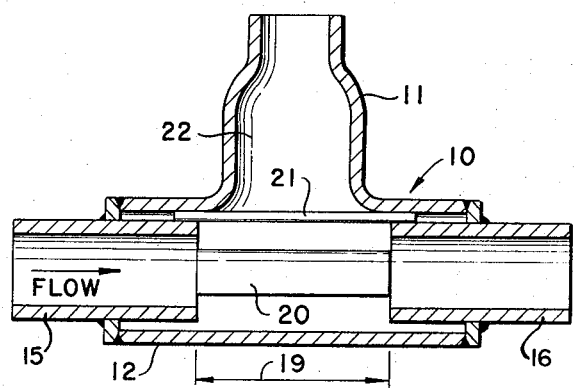
FIG. 1 is a top plan view of a pipe tee in accordance with the teaching of our invention.

Referring now to FIG. 1 of the drawing, a pipe tee 10 is shown having a branch outlet 11 and a run 12. The branch outlet 11 terminates for coupling the branch outlet 11 to a pipeline (not shown). The run 12 of pipe tee 10 includes an inlet 15 and an outlet 16. Inlet 15 and outlet 16 each terminate, respectively, for coupling the run 12 of pipe tee 10 to a pipeline (not shown).

A gap 19 is formed at the junction of branch outlet 11 with run 12. Gap 19 is substantially equal in length to the distance between front and rear scraper cups on a conventional pipeline pig (not shown) as will be discussed further hereinbelow. An inclined ramp 20 (FIG. 2) extends from the inlet 15 of the run 12 to the outlet 16 thereof. Thus, the longitudinal axis of the inlet 15 to run 12 is offset to and slightly above the longitudinal axis of the outlet 16 of run 12. Both longitudinal axis, however, are parallel to each other as can be seen in FIG. 2.

Figure 3:
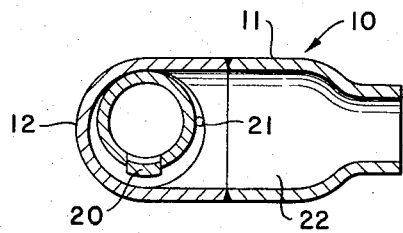
FIG. 3 is a cross-sectional view of the pipe tee of FIGS. 1 and 2 taken along line 3—3 of FIG. 2.

A longitudinal guide bar 21 extends across substantially the middle of the inlet 22 of the branch outlet 11 to run 12. In this manner, pipeline spheres or pigs are restrained from entering the branch outlet 11. A key point regarding the location of the restraining bar 21 and the gap 19 is that they are combined in a manner to prevent the sphere (or pig) from blocking the branch outlet, as seen in FIG. 3. By providing sufficient flow area around the sphere, the flow can pass around the sphere and out the branch with minimum hydrodynamic force on the sphere when the run outlet 16 is blocked downstream. This technique allows the bar 21 to be of lighter construction and reduces pressure drop.

Various arrangement may be used for forming pipe tee 10. For example, in the embodiment illustrated in FIGS. 1 through 3, the pipe tee 10 may be formed by providing an oversized outer tee which comprises the branch outlet 11 and a portion of the run 12 perpendicular to branch outlet 11. The complete run 12 may be formed by telescopingly inserting inlet and outlet portions 15 and 16 into the free ends of the oversized portion of the run 12 connected to branch outlet 11. The junctures of the component parts of the so-formed pipe tee 10 may be welded so that a fluid-tight seal is provided. The inlet portion 15 of run 12 is preferably provided with a tab 22a which forms ramp 20; outlet portion 16 is provided with a tab 23 which, together with tab 22a, forms gap 19. In this manner, a suitable gap area may be provided between portions 15 and 16 and the run of the oversized outer tee.

Figure 2:
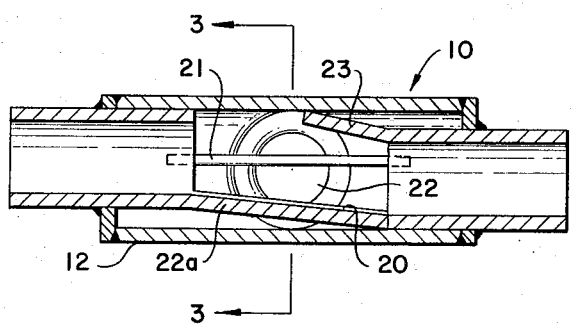
FIG. 2 is a vertical cross-sectional view of the pipe tee of FIG. 1.
Figure 4:
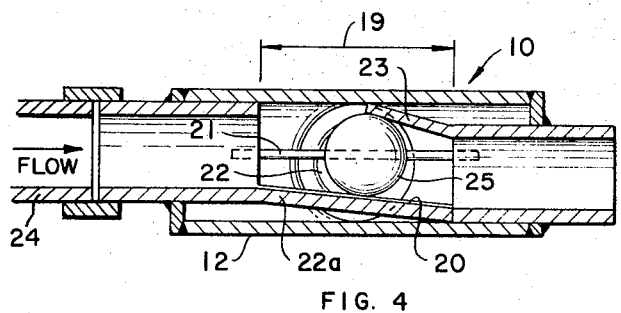
FIGS. 4 and 5 are vertical sectional views of the pipe tee of FIGS. 1 through 3 in operative position with a pipeline system showing alternate types of pipeline pigs circulating therethrough.
Figure 5:
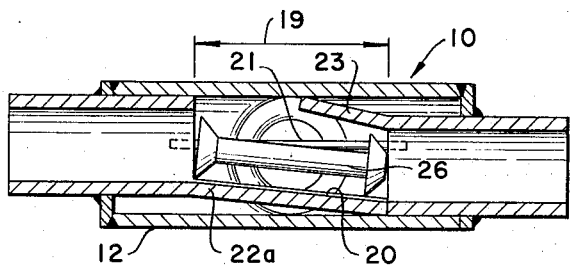

Referring now to FIG. 4, the pipe tee 10 of FIGS. 1 through 3 is shown connected to a pipeline 24. The arrow indicates the direction of flow through pipeline 24. This arrow corresponds to the arrow in FIG. 1 which shows the direction of flow through pipe tee 10 when coupled to pipeline 24. A conventional pipeline pig, in the form of a ball or sphere 25, is shown within the run 12 of pipe tee 10 and disposed in gap 19. Similarly, the pipeline pig in FIG. 5, in the form of a scraper 26 having front end rear scraper cups, is shown disposed within gap 19. Gap 19 in FIG. 5 is substantially equal in length to the distance between the front and rear scraper cups, as for example, 5 ½ inches.

In both cases, with fluid flow through pipeline 24 in the direction of the arrow, the pipeline pig (either sphere 25 or scraper 26) enters the run 12 of pipeline tee 10. Bar 21 restrains the pig from entering branch outlet 11. The pigs pass down ramp 20, and with the outlet 11 blocked, there is no pressure surge with the sphere 25, and only a minor surge (less than 10 psi) with the scraper 26 since, as can be seen in FIG. 4, fluid flows around the sphere through the remaining area of gap 19 out the branch 11 with very little pressure loss. The length of the gap 19 is made equal to the scraper 26 cup spacing. Thus, the rear cup pushes the front cup through the gap, and when the rear cup enters the gap, the front cup starts into outlet 16. If outlet 16 is blocked, the front cup folds back and allows fluid to pass back around the front cup as it is forced into the outlet 16. This causes a small rise in pressure (less than 10 psi), since the rear cup quickly clears inlet 15 and fluid can then bypass around the rear cup, through gap 19, and pass out the branch 11. Note that the sloping ramp 20 serves no purpose when handling scrapers. It allows spheres to roll down the ramp (and across gap 19) at almost nil flow velocity. At velocities above 1 to 2 feet per second, spheres move through the gap on a flat track, e.g., the sloping ramp is not always necessary and might be deleted on some applications.

Utilizing the pipeline flow tee 10 of our invention, errors or malfunctions in bypass valve sequencing will not cause damage to the pipeline, sphere or scraper. In regard to pressure drop characteristics, the use of flow tee 10 causes a minimum of permanent pressure drop.

Although only a single longitudinal guide bar 21 has been disclosed as sufficient to restrain a sphere from entering the branch, obviously a plurality of such bars may be provided for restraining pipeline pigs from entering outlet 11. However, while any number of longitudinal bars will not increase the risk of damage to pipeline pigs during passage through tee 10, multiple bars are objectionable from the standpoint of possibly trapping large objects, such as scraper parts, uninflated spheres, skids, etc. In both cases, however, only the bottom ramp (or track) 20 contacts the sphere or scraper within gap 19.

Pipeline pigs passing through the flow tee 10 as discussed hereinabove are not circumferentially contacted by the walls of the tee or other constraining elements while located within the tee (where fluid flow through the run of the tee bypasses the pig). No orifices or outlets are required on the downstream run outlet. Because the pig is not gripped circumferentially or held in the run, it moves in response to extremely low hydrodynamic forces. The downwardly sloped ramp 20 allows the sphere to roll towards the downstream run outlet.

EXAMPLE

The following is an illustrative example of the evaluation of the flow tee 10 installed in a pipeline. The fluid used was Texaco Almag Industrial Oil. A constant fluid temperature of 90° F. was used. At this temperature, the Texaco Almag Oil has a specific gravity of 0.837 and a kinematic viscosity of 7.6 centistokes. Pressure drop data was taken with a U-tube mercury manometer indicating the differential pressure. Velocity measurements were taken by automatically timing the pipeline pig passage between two pipeline pig detectors located 51.83 feet apart. The pipeline pig was run through the flow tee at varying velocities with the branch outlet blocked. The run of the flow tee was 4 inches in diameter, the branch outlet was 3 inches in diameter, and schedule 40 size pipe was used throughout. The pressure drop was determined from the pressure upstream of the tee and on the branch 10 feet downstream from the branch outlet. In a separate data run, pressures were also taken between a point immediately downstream of the branch outlet on the branch and the same point on the branch ten feet downstream from the branch outlet. This procedure produced a correction which was applied to the pipeline flow tee and this, along with a velocity head correction, gave the true total head loss across the pipeline flow tee. The resistance coefficient ($K$) and the equivalent length ($L/D$) have been calculated as a means of presenting a factor which may be used to scale the performance of the flow tee to geometrically similar larger or smaller ones. The resistance coefficient ($K$) in the equation $H_L = KV^2/2g$ is defined as the number of velocity heads lost due to the passage of the liquid through the flow tee. The ratio ($L/D$) is the equivalent length in pipe diameters of straight pipe which will cause the same pressure drop as the flow tee under the same flow conditions. Both the resistance coefficient ($K$) and the equivalent length ratio ($L/D$) are based on the tee run size. The L/D ratio was computed using the Fanning pressure drop formula with friction factor for new (clean) steel pipe.

The following data was obtained showing the low pressure drops obtained utilizing the flow tee of our invention:

| Velocity (FPS) | Flow (GPM) | Pressure Flow (BPD) | Drop (PST) | Resistance Coefficient-K | Equivalent Length-L/D |
|---|---|---|---|---|---|
| 1.5 | 61. | 2104. | 0.02 | 1.56 | 44. |
| 4.0 | 158. | 5424. | 0.10 | 1.13 | 41. |
| 5.9 | 232. | 7968. | 0.22 | 1.13 | 45. |
| 7.8 | 310. | 10636. | 0.34 | 0.98 | 42. |
| 9.2 | 364. | 12480. | 0.45 | 0.95 | 43. |
| 10.0 | 397. | 13604. | 0.53 | 0.95 | 43. |

We claim as our invention:

1. A pipeline flow tee adapted to pass a pipeline pig therethrough comprising:

a run adapted to pass fluid having a substantially horizontal inlet portion and a substantially horizontal outlet portion of the same diameter;

a branch outlet adapted to pass fluid connected to said run and substantially perpendicular thereto having an inlet portion communicating with the interior of said run and an outlet portion communicating with said branch outlet inlet portion, said branch outlet and said run comprising a tee-shaped pipe section with a leg of said tee-shaped pipe section forming said branch outlet and a pair of longitudinally-extending pipe sections telescopingly fitting in each end of the run of said tee-shaped pipe section comprising the run of said pipeline flow tee;

gap means formed in said run at the junction of said run with said branch outlet and adapted to pass fluid through said run when the junction of said run with said branch outlet is occupied by a pipeline pig;

pipeline pig guiding means comprising a straight guide bar extending across substantially the middle of the inlet portion of said branch outlet for restraining said pipeline pig passing through said run from entering said branch outlet, said guide bar being spaced away from the inlet portion of said branch outlet in such a manner that when a sphere is in said gap means, fluid may flow around said sphere and out said branch outlet; and an inclined ramp leading from the inlet portion of said run to the outlet portion thereof, said ramp being adapted to roll said pipeline pig downwardly through said run when said run is oriented in a horizontal direction with the longitudinal axis of the inlet portion of said run being uppermost with respect to the longitudinal axis of the outlet portion of said run.

2. The flow tee of claim 1 wherein the pig is a sphere and the gap means has a diameter greater than the diameter of the sphere and a length approximately equal to between 1-½ and 2 times the diameter of the sphere.

* * * * *